Oct. 15, 1957  F. DANIELS  2,809,931
NEUTRONIC REACTOR SYSTEM
Filed Oct. 11, 1945  3 Sheets-Sheet 1
FIG.1.
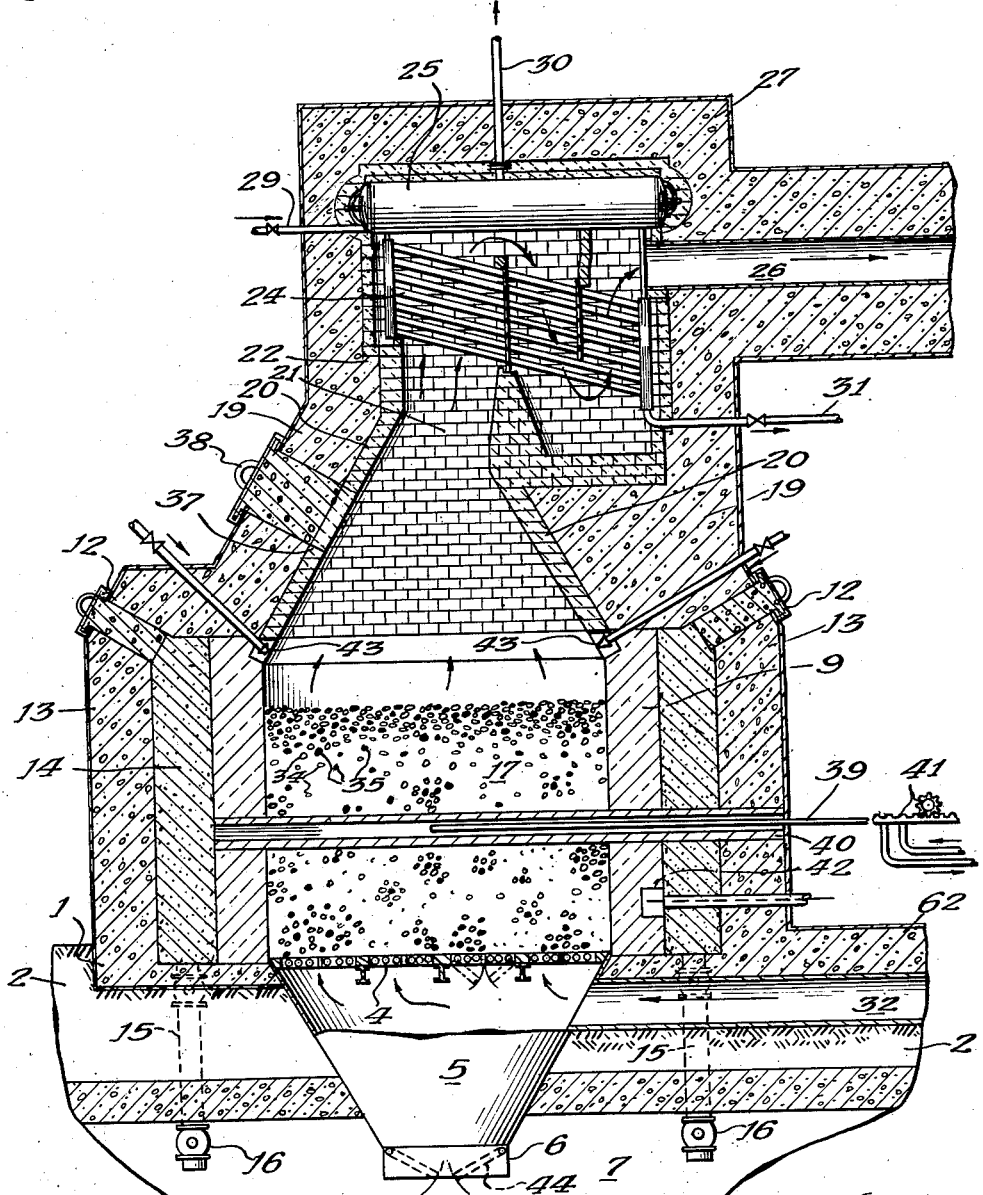
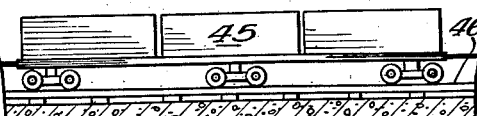

Oct. 15, 1957 F. DANIELS 2,809,931
NEUTRONIC REACTOR SYSTEM
Filed Oct. 11, 1945 3 Sheets-Sheet 3

Witnesses:
Herbert E. Metcalf
Estill E. Ezell

Inventor:
Farrington Daniels
By:
Attorney

:::::::::::::::::::::::::::::::::::::::::::::::::::::::::::::::::::::::::::::::::::::::::::::::::::::::::::::::::::::::::::::::::::::::

United States Patent Office 2,809,931
Patented Oct. 15, 1957

2,809,931

NEUTRONIC REACTOR SYSTEM

Farrington Daniels, Chicago, Ill., assignor to the United States of America as represented by the United States Atomic Energy Commission Application October 11, 1945, Serial No. 621,845

2 Claims. (Cl. 204—193.2)

The present invention relates to atomic power plants and more particularly to a neutronic reactor from which heat can be removed to produce power in useful form.

In neutronic reactors a neutron fissionable isotope such as $U^{233}$, $U^{235}$ or $94^{239}$ or mixtures thereof is subjected to nuclear fission by absorption of slow neutrons, and a self-sustaining chain reaction is established by the neutrons evolved by the fission. In general such reactors may comprise bodies of compositions containing fissionable material, such as for example, natural uranium containing .7 percent of $U^{235}$ disposed in a regular geometrical pattern in a neutron slowing material or moderator. Graphite and beryllium are typical moderators suitable for such use. Heat is evolved during the fission reaction and is customarily removed by passage of a coolant through the reactor usually in heat exchange relationship with the uranium. In such reactors the transuranic element 94 (plutonium) is formed as a by-product of the reaction. Specific details of the theory and essential characteristics of such reactors are set forth in copending application of Enrico Fermi and Leo Szilard, Serial No. 568,904, filed December 19, 1944, now U. S. Patent 2,708,656.

Gases (as well as liquids) have been utilized as a coolant to carry away the heat of reaction. When gases have been used they were forced through definite channels in the moderator in which the uranium is positioned. The arrangement of such channels was determined by the uranium body geometry and for heat removal at high power outputs has required the cooling gas to be applied at high pressures in order to force it through the channels in sufficiently large quantities to obtain a required temperature equilibrium. This type of gas cooled reactor has been disclosed and claimed in detail in the Fermi and Leverett application Serial Number 578,278, filed February 16, 1945, and the present invention is an improvement thereon.

The present invention is primarily concerned with the heating of gases by a novel type of neutronic reactor in which the moderator and the uranium are in separate unconformable units in the form of chunks, pebbles, approximate spheres, etc. for example mixed together in random adjacent relationship but with a definite overall average volume ratio. The reactor thus constructed has desirably large and communicating void spaces providing multiple, irregular and communicating channels extending throughout the entire reactor in all directions. A cooling gas can then be passed through the reactor with an exceptionally low pressure drop therein, and in large volume. When the reactor is operated at temperatures from above 100° C. to the maximum of 2000° C., the exit gases can then be used to generate vapor under pressure, such as steam, in boilers of substantially standard design or the heated gases can be used directly in gas turbines. In other words such a pebble bed reactor, as it may be called, can be used in place of the fire bed in boilers, with only minor design modification of standard boiler design.

It is therefore an object of the present invention to provide a novel means and method of efficiently supplying hot gases useful in producing power, using the heating effect of a neutronic reaction in place of the ordinarily used fuel combustion.

Another object of this invention is the provision of a novel neutronic reactor ideally suited to heat gases passing therethrough to high temperatures.

A still further object of this invention is to provide a novel neutronically reactive composition.

Other objects and advantages of the present invention will be more readily understood by reference to the following description taken with the attached drawings, wherein:

Fig. 1 is a diagrammatic sectional view partly in elevation of a pebble reactor positioned to supply hot gases to a boiler;

Figure 2:
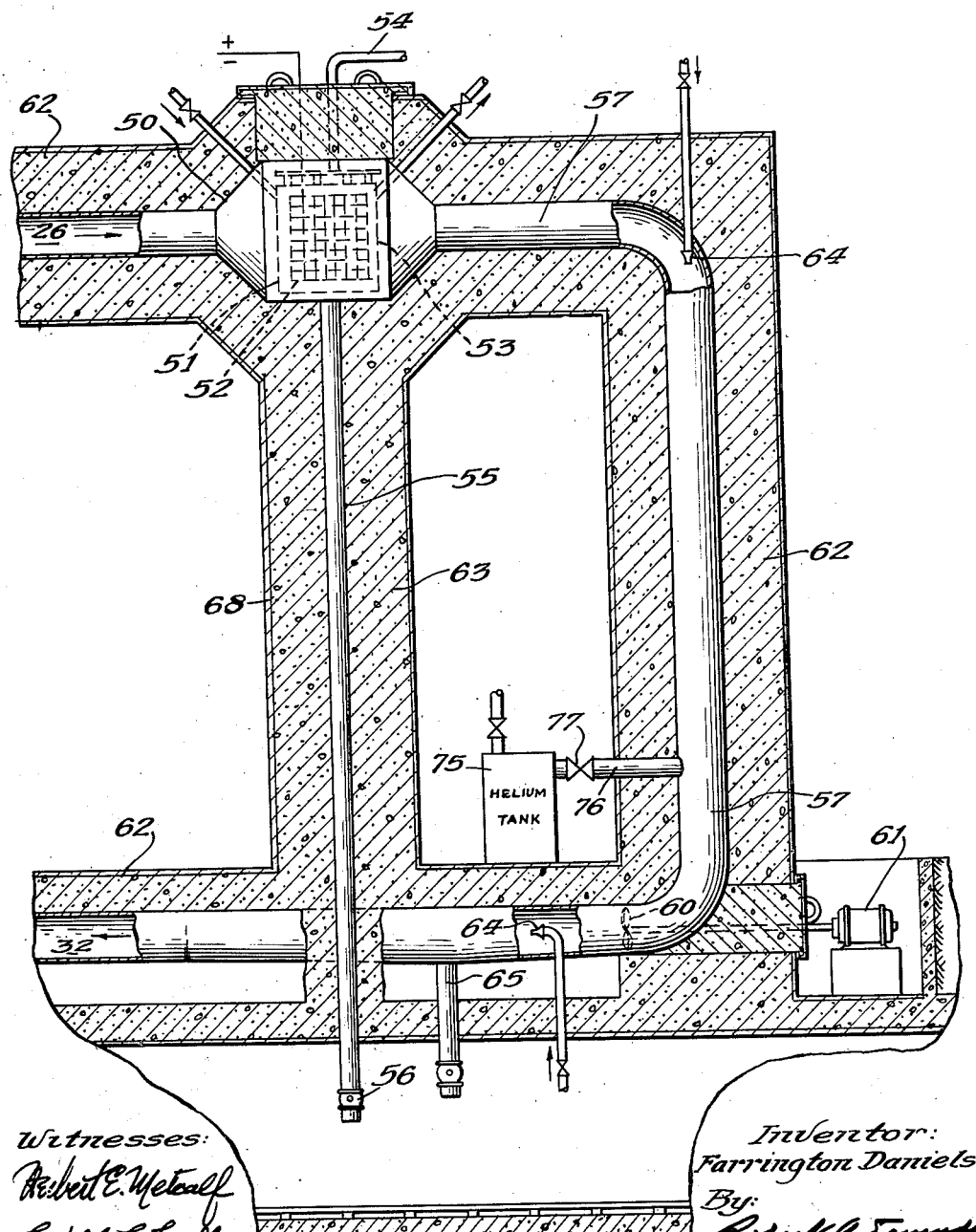
Fig. 2 is a diagrammatic view partly in section and partly in elevation of a closed gas circulating system for the device shown in Fig. 1.

The structure of the system will be described before taking up the nuclear physics of the system.

Referring first to Fig. 1, a concrete foundation 1 is provided resting on the earth 2 supporting a plurality of water cooled grates 4. Grates 4 extend across a coned gas space 5 terminating below in a discharge pipe 6 extending into a discharge tunnel 7 positioned well below ground level. Around grates 4 is erected a cylindrical wall reflector 9 of neutron reflecting material in the form of bricks or blocks. The reflector 9 is surrounded by a cylindrical concrete side wall 13, five to ten feet thick, for example, erected on the foundation 1 which is spaced from the reflector 9 providing a cylindrical absorber space 14. Absorber material may be discharged into tunnel 7 through an absorber outlet pipe 15 and valve 16. A cylindrical reactor space 17 is thus formed above the grates 4 in which a novel neutronically reactive composition is to be placed, as later described.

Above reactor space 17, converging concrete flue walls 19 are provided, lined with special fire brick 20 of pressed beryllium oxide or magnesium oxide of sufficient thickness to protect the surrounding concrete. The outlet 21 of the flue enters a boiler space 22 in which water tubes 24 are positioned connected in conventional manner to an expansion chamber 25. The flue gases pass over the tubes 24 several times in customary fashion to emerge into a gas outlet passage 26. The water boiler described is intended to be conventional, as any modern boiler adapted to handle hot gases of the temperatures provided by the reactor will be satisfactory, and the example shown is illustrative only. The entire boiler is covered by a concrete radiation shield 27 extended from the flue concrete which is lined with pressed magnesium oxide. Feed inlet 29, steam outlet 30 and blow-off pipe 31 extend through radiation shield 27. The passage 26 may be lined with pressed magnesium oxide if required to protect the concrete.

Beneath grates 4, a gas inlet 32 is provided, entering coned gas space 5. Thus a clear gas circulation path is provided through grates 4, reactor space 17, the boiler space 22 and gas outlet passage 26.

The reactor space 17 is to be filled with a neutronically active composition consisting primarily of unconformable lumps or units 34 of a neutron moderator such as graphite, or sintered beryllium oxide, and lumps or units 35 of a material containing a fissionable isotope, such as uranium metal, uranium carbide or sintered uranium oxide. All of the latter units 35 contain $U^{235}$, a fissionable isotope.

These discrete units 34 and 35 are preferably of approximately the same size and approximate shape, and are shaped so that they do not fit closely together. For example, rough spheres 1 to 3 inches in diameter are satisfactory and are loaded in random adjacent mix through loading opening 37 above the reactor space 17 to fill the reactor space 17. With this arrangement the reactor space 17 will contain approximately 50 to 80 percent of solid material and 50 to 20 percent void spaces. The overall volume ratio however, of moderator to uranium is predetermined. Loading opening 37 is closed with a concrete and fire brick plug 38.

Control of the reaction is provided by use, for example, of a control rod 39 of a material having high neutron absorption such as cadmium, or boron, water cooled, which slides in a horizontal refractory sheath 40 of graphite or BeO. The control rod 39 is operated by rack and pinion 41, to insert more or less of the absorber into the reactor as desired. The neutron density is monitored, for example, by an ionization chamber 42. A "last resort" safety mechanism is provided by water jets 43 directed to the top of the reactor.

As it may be desirable to discharge some of the reactive units 34 and 35 from time to time, grates 4 can be operated in conventional manner to drop a quantity of units into coned space 5 from which they roll into the discharge pipe 6. By the use of discharge valve 44, which is preferably remotely controlled, the units are deposited in shielded cars 45 operating on tracks 46 in tunnel 7. The units may then be transported, if desired, to a chemical plant where the uranium is purified by removal of the radioactive fission products developed therein as the result of nuclear fission. Any element 94 produced by neutron absorption in the $U^{238}$ content of the uranium may also be removed chemically from the discharged units when desired. For each amount of material discharged from the bottom of the reactor, fresh material can be added to the top of the reactor through loading opening 37, thereby maintaining the proper amount of reactive composition in the reactor at all times to insure the maintenance of the chain reaction.

Figure 3:
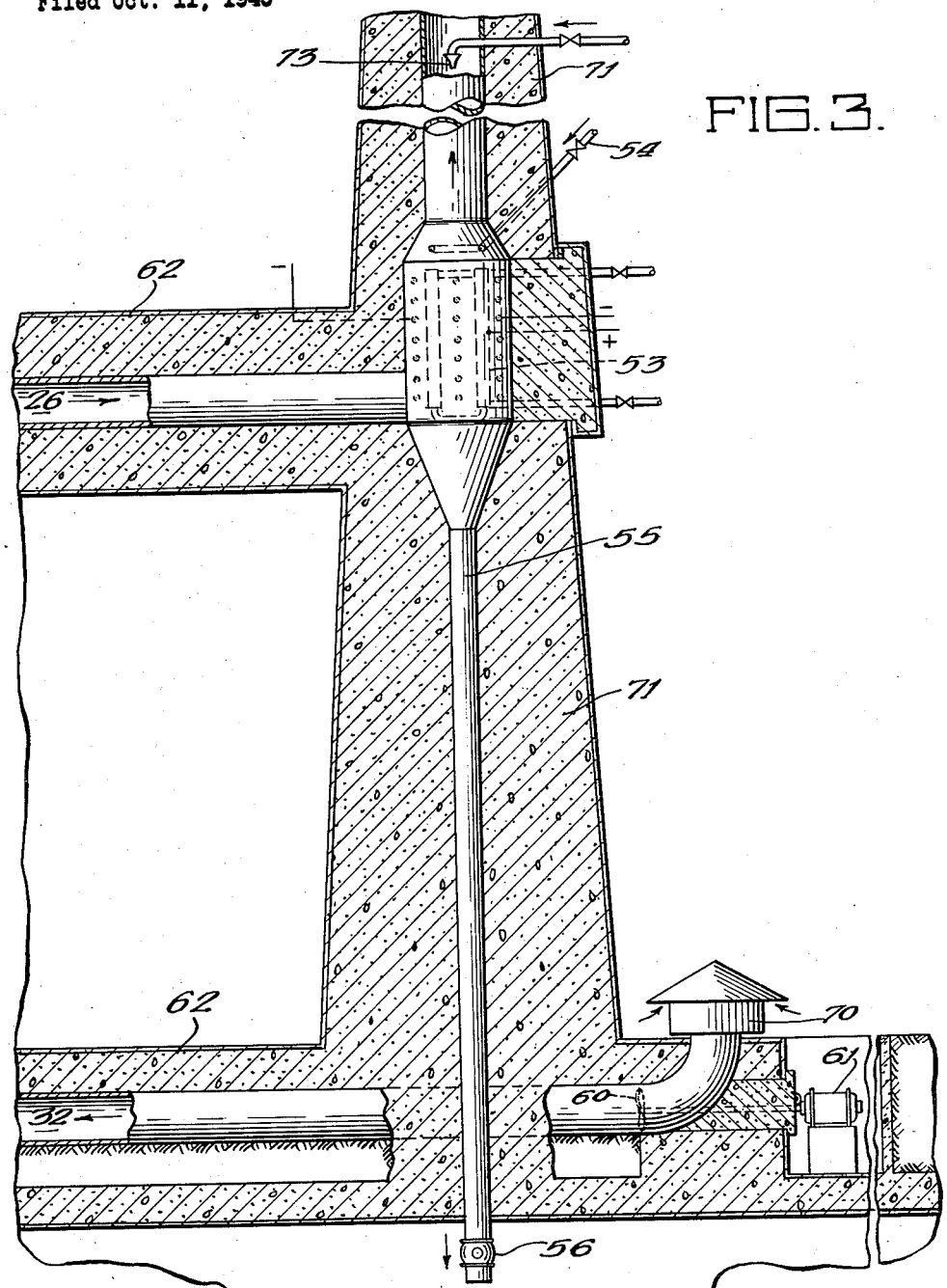
Fig. 3 is a diagrammatic view partly in section and partly in elevation of an air circulating system for the device shown in Fig. 1.

The gas used as a heat transfer medium between reactor and boiler can be circulated through the reactor in a number of ways, two of which are shown in Figs. 2 and 3.

Referring first to Fig. 2, which diagrammatically illustrates a preferred type of closed circulating system using helium, the gas outlet 26 from the boiler is continued to a precipitating chamber 50 in which are located water cooled negatively charged electrode plates 51, in between which is a positively charged electrode 52. There may be a plurality of such electrodes 51 and 52 to form an electrostatic precipitator 53 of conventional design. Radioactive fission fragments entering the gas stream will be deposited on the water cooled plates 51 and are thus prevented from being recirculated. These fission fragments can be washed or dissolved from plates 51 by flowing water or a dissolving solution over them from solution pipe 54, the liquid then being conducted through product pipe 55 to tunnel 7 under control of valve 56. This highly radioactive material may be then deposited in the shielded cars 45 for removal to a concentration plant where the radioactive products can be separated for use as radiation sources as desired. The radioactive fission fragments enter the cooling stream due to fissions taking place at or close to the surface of the naked uranium bodies.

Due to the fact that a relatively large amount of such radioactive fission fragments may be present in the gas flow from the gas outlet 26 to the precipitator 53 a heavy radiation shield 62 is placed around the gas line.

After the gases have passed through the precipitator 53, they enter a gas conduit 57 which turns downwardly to bend laterally again to join gas inlet 32, thereby closing the circulation path.

The gas is moved around the circulation path by one or more blowers, such as fan 60 driven by motor 61. Fan 60 is preferably positioned at the beginning of the straight run of conduit 57 into gas inlet 32.

Some radioactive gaseous fission products can pass the precipitator 53 and later decay to radioactive solids. These solids may be deposited between the precipitator 53 and the fan 60, so this portion of the line is also provided with an extension of shield 62. Product pipe 55 is also provided with a radiation shield 63. Deposited solid fission products can be removed from the gas line as desired by conveniently located solution sprays 64 and drains 65.

The system is enclosed in a welded gas-tight iron shell 68, all openings therethrough being suitably sealed. The system is maintained gas-tight throughout.

Figure 3 shows diagrammatically an open or, once-through system, where the gaseous heat transfer medium is air. In this case fan 60 takes air from a filter 70 close to the ground level and forces this air through the reactor and the boiler. The exit air then passes through the precipitator 53 located in a stack 71 and is discharged from the top thereof. This stack is preferably made high, about 100 to 150 feet, so that gaseous fission products, and argon 41 formed in the air while in the reactor, will be greatly diluted before reaching the ground or contacting personnel in the vicinity. The fission fragments caught in the precipitator 53 are disposed of through the base of stack 71 through pipe 55. The stack may be cleared of deposited fission products by spray nozzles 73 in the stack.

Referring now to the nuclear physics aspects of the reactor and the system, the closed circulatory system will first be discussed.

As helium is a gas which does not absorb neutrons, it can advantageously be used for the gaseous transfer medium in the closed system and, due to the type of reactor used, the helium can be circulated at low pressure. As helium is also an inert gas, not combining with other materials, the reactor units can be made from materials that can not be used when air is the cooling medium. To charge the closed circulating system, it is exhausted or flushed and helium is supplied from helium container 75 through helium pipe 76 under control of helium valve 77. The overall pressure of the helium in the circulation system is preferably held just above atmosphere and the system welded gas tight. If leaks occur the slight positive pressure will force helium out, and thus prevent the entrance of air, with consequent oxidation of reactor materials.

In one form, the helium cooled reactor uses units approximating the shape of spheres of uranium carbide averaging about 2 inches in diameter as the fissionable element, and units approximating the shape of the same average diameter of graphite as the moderating element, with a volume ratio of graphite to uranium of about 100—1. As the relationship of moderator to uranium is not close to the optimum in this type of reactor due to the large number of voids the reactor will be relatively large. A cylinder about 36 feet high and 36 feet in diameter having a volume of 36,000 cubic feet filled with 2 inch units is used. The weight of the uranium component of the fuel is 100 tons, of graphite 860 tons. The reactor will, therefore, contain about 7,770,000 2-inch units. Void space with the 2 inch units is about 50 percent of the total volume, and the random adjacent mixing of the units provides an irregular body geometry where on the average every fourth or fifth unit in each direction is uranium. The units may be rough spheres one to three inches in diameter. The reactor as above described will be just above the critical size where the reproduction ratio is unity. When the control rod is removed from the reactor the neutron reproduction ratio in the reactor will be slightly above unity. With the rod removed, the neutron density in the reactor rises, heat is developed and the helium blown through the reactor is heated. When the desired operating power is reached, the control rod is inserted to reduce the neutron reproduction ratio to unity, thereby holding the reactor at the power attained at the end of the neutron density rise.

In case of failure of the control rod to control the reaction, emergency measures can be taken, first, by dumping a portion of the units by use of grates 4, or second by discharging water, a relatively good neutron absorber, onto the top of the reactor from jets 43. It has been found that there is no danger from the steam formed in so discharging water onto units heated to 2000° C. Water is preferred for this use as no neutron absorbing residue is left in the reactor after use. It is, however, only used as a last resort emergency measure. Most of the heat is developed in the uranium carbide, but this heat is spread throughout the reactor by radiation, convection, and conduction. Due to the multiple, irregular and interconnecting channels provided by the many voids, the cross section for the helium path can be considered as the cross section of the reactor, and at high temperatures the transfer of heat by radiation is important as it tends to keep the entire reactor at a substantially uniform temperature, thus minimizing overheating of the center of the reactor where the neutron density and consequently heat release is the greatest. There will of course be a vertical temperature gradient due to the entrance of the cool gas at the bottom of the reactor.

With the reactor operating to provide a maximum exit temperature of helium from the top of the reactor of 2000° C., the helium is circulated at the rate of 300,000 cubic feet per minute and passes through the boiler, giving up its heat to make steam. The helium is further cooled in the precipitator, and the water from the precipitator plates and from grates 4 can be used as preheated feed for the boiler if desired.

The maximum power is developed when 2000° C. helium is cooled to 100° C. in the boiler and circulatory system and then recirculated through the reactor; about 250,000 kilowatts will be carried away from the reactor. This heat, when subjected to boiler losses and mechanical conversion efficiency losses, will provide about 80,000 kilowatts of electrical energy varying in accordance with the boiler efficiency and conversion to mechanical and electrical power.

Due to the many voids, the pressure drop through the pebble bed reactor described is very low, about 3 pounds per square inch for 2 inch spheres, about double that value for 1 inch spheres. This drop is much smaller than in gas cooled reactors using specific uranium body geometries, where the gas is passed only through narrow channels adjacent the surfaces of uranium rods or lumps. For this reason gas blowing costs in the pebble bed reactor are relatively low. Three 100,000 cubic feet blowers will handle the gas at an expenditure of only about 4500 kilowatts of energy.

When the pebble bed reactor is operated at the maximum temperature of 2000° C., uranium carbide is used because of its high melting point, about 2300° C. Further, due to the fact that boilers are not usually designed to handle a heat input as high as 250,000 kilowatts several boilers are preferably used, close together and manifolded to receive the hot helium gas.

However, it is not necessary to operate the pebble bed reactor at its maximum heat development of 2000° C., as it can be operated at lower temperatures and powers as desired. If temperatures below about 900° C. are used, uranium metal can be used for the units 35, the melting point of the metal being about 1100° C. At lower powers a corresponding saving is made in blowing costs. Thus the power developed can be fitted to various boiler designs.

It should also be understood that units 34 and 35, while described as being roughly of spherical shape, can be of any shape, even highly irregular in surface, which when mixed will provide the desired intercommunicating voids and give the desired over all volume ratio of moderator to uranium. These latter two factors are the essence of the present invention irrespective of how attained.

When the uranium carbide and graphite moderator units are used, the reflecting layer may be of graphite bricks.

The use of the absorption space 14 outside of the graphite layer will next be considered. In any power unit such as has just been described the nuclear reaction fissions or "burns" the fissionable isotope $U^{235}$ at the start of the reaction. As the reaction continues the fissionable isotope $94^{239}$ is formed but not with unity conversion ratio and is also fissioned. In conventional graphite-uranium reactors only about .80 atom of $94^{239}$ are formed for each atom of $U^{235}$ destroyed by fission, a clear loss of fissionable isotope of 20 percent. As the total amount of uranium readily available in the world is presently throught to be limited (about 20,000 tons) the amount of $U^{235}$, existing only as .7 percent of natural uranium is about 140 times less. In consequence it is desirable to increase the fissionable isotope conversion factor as much as possible.

Irrespective of the presence of reflector 9 some neutrons are normally lost by escape beyond the reflector. While this loss varies with the size and composition of the reactor and reflector, 5 percent is a conservative figure. The majority of these normally lost neutrons can be absorbed in a non-fissionable isotope, such as thorium ($90^{232}$) for example to produce the fissionable isotope $U^{233}$ according to the following process:

The thorium is placed in absorbing space 14 as $ThO_2$ powder or small lumps alone or mixed with graphite, left there to absorb leakage neutrons, and removed at intervals to chemically separate the $U^{233}$ formed from the thorium. In this manner the ratio of fissionable isotope "burned" to fissionable isotopes formed, is raised by a few percent by the $U^{233}$ production.

When air is used to cool the reactor and transfer the heat to the boiler, units of different materials are used in the reactor to avoid oxidation. In this case the moderator units are preferably made of beryllium oxide (BeO) compressed and sintered to density 3, and uranium oxide ($U_3O^8$) compressed and sintered to density 6. While the uranium atom density in the oxide is less than in the metal or the carbide, the BeO moderator is more efficient than graphite. In consequence the two effects substantially balance leaving the reactor substantially the same size but with a slightly smaller ratio of moderator to uranium. When BeO is used as a moderator, BeO bricks are also used as the reflector to avoid oxidation and BeO is also better than graphite as a reflector. This type of reactor can be operated up to a maximum of about 1500° C. outlet air temperature with a power output of about 100,000 kilowatts.

In reactors operating at high neutron densities such as the reactor presently described, radioactive elements of exceedingly high capture cross section may be formed relatively quickly in the uranium as an intermediate element in the decay chains of the fission fragments and this formation can change the neutron reproduction ratio during operation if these elements remain in the reactor. One of the most important of these decay chains is believed to be the 135 fission chain starting with Te (short) →I (6.6 hr)→ Xe (9.4 hr)→Cs (20–30 yr)→barium, the parenthetical times indicating half lives. The neutron absorption of tellurium, iodine, caesium and barium is relatively unimportant, but the neutron capture cross section of radioactive xenon$^{135}$ has been measured to be about $2,500,000 \times 10^{-24}$ cm.$^2$, many times larger than that for stable gadolinium for example, the cross section of which is about $30,000 \times 10^{-24}$ cm.$^2$. Upon absorption of a neutron, xenon$^{135}$ shifts to xenon$^{136}$, an element of relatively small capture cross section.

The rate of production of the Te is a function of the neutron density in which the uranium is immersed, and therefore dependent upon the power at which reactors of given type are operated. The radioactive xenon$^{135}$ is produced with a noticeable effect on the reaction a few hours after the reaction is started and the effect is, of course, greater as the neutron density is increased and maintained. The xenon$^{135}$ effect in high power reactors can be summarized as follows when all the xenon remains in the reactor.

The reaction is started by withdrawing the control rod. The neutron density rises at a rate determined by the reproduction ratio and the effect of the delayed neutrons, until some predetermined neutron density is attained. The control rod is then placed in the unity reproduction ratio position and the reaction is stabilized at the power desired. During this time radioactive Te and iodine is formed, decaying to xenon$^{135}$. As more and more iodine decays, more and more xenon$^{135}$ is formed, this xenon$^{135}$ absorbing sufficient neutrons to reduce the reproduction ratio below unity. This absorption also converts the xenon$^{135}$ to xenon $^{136}$ which has no excessive capture cross section. The neutron density drops. If no compensation were made by the rod for this drop the density might drop until background conditions prevailed, and then the reaction might automatically start up as the xenon$^{135}$ decayed. Normally the neutron density drop is compensated for by removal of the control rod to a new position where the reproduction ratio is again above unity. A neutron density rise occurs, bringing the density back to its former level. Again, more xenon$^{135}$ is formed and the process is repeated until an equilibrium condition is reached where the xenon$^{135}$ formed is transmuted by neutron absorption and by decay into isotopes of lower capture cross section as fast as it is being formed. In the meantime, the control rod (or equivalent) has to be withdrawn by an amount thereby removing from the reactor, neutron absorbers at least equal in effect to the absorption caused by the xenon$^{135}$.

In the reactors, as presently described, particularly when operated at high neutron densities, some of the tellurium, iodine and xenon$^{135}$ will be diffused from the uranium into the cooling gas. In the closed gas circulation system, some of the circulating poisons will be returned to the reactor and some will decay to be picked up by the precipitator, or will be deposited on the gas line walls. With air, however, the diffused material will be completely removed from the system. Thus, in this respect, the air cooled reactor will require somewhat less of the reactive composition to maintain a reproduction ratio of unity at a given temperature (power) of operation than will the helium cooled reactor. As the amount of material of high capture cross section diffused from the uranium units will depend somewhat on the temperature at which the reactor is operated, critical size, during operation, that is, the size at which the reproduction ratio can be held at unity, and operating size, that is, a size only slightly above critical size at which the reproduction ratio can be slightly above unity, are readily obtained by changing the actual size of the reactor. The reactor described can be enlarged as desired by loading more units on top, or reduced by discharging units from the bottom. Thus, the reactor can be changed in size as desired to compensate for changes in reproduction ratio due to changes in operating conditions of any sort. Such changes in size can also be made to accommodate long term changes in reproduction ratio, such as a size due to accumulation of element 94 which is somewhat more efficient than U$^{235}$ as a fissionable material, or such as a reduction due to neutron absorption in accumulation of stable residual fission fragments in the uranium.

Enrichment of the uranium in fissionable isotope such as for example, by raising the U$^{235}$ content or adding 94$^{239}$ or U$^{233}$ will permit reduction in reactor size in accordance with the amount of enrichment made. Too great a reduction in size however is not preferred as it reduces the cross section of the gas path through the reactor and thereby increases the pressure drop at high power operation. However, the present invention is clearly applicable to enriched reactors of any size, and the advantages of the pebble bed reactor herein disclosed will still apply. Further, the present invention contemplates a pebble bed reactor in which the units 34 and 35 each contain moderator and fissionable material.

Summarizing, it will be seen from the above description that the pebble bed reactor is ideally suited to supply hot gases resulting from the heat of a nuclear reaction, at temperatures sufficiently high to be useful and efficient to produce power. These advantages can be summarized as follows:

(1) Simplification of circulating system and reduction of cost of cooling due to low pressure drop.

(2) Uniformity of temperature in reactor through thermal radiation at high temperatures.

(3) Increased thermodynamic efficiency for power purposes because of high heat transfer efficiencies.

(4) Simplicity of structure as exact geometrical spacing of the uranium bodies is not used.

(5) No cooling pipes or foreign material (other than control rod and sheath) are required inside reactor, thus reducing parasitic neutron losses.

(6) Simultaneous production of power and fissionable isotopes suitable for re-use.

(7) High isotope conversion factor—both 94 and U$^{233}$ are produced during operation.

(8) Last and perhaps most important, the pebble type reactor supplies hot gas within the temperature ranges and at gas pressures presently obtained by burning combustible fuel such as gas, coal and oil, thereby permitting the utilization of the heat of the nuclear reaction in standard steam plants of existing designs, in binary systems, such as mercury—steam systems, or in gas turbines.

While the pebble bed reactor construction described herein has been cooled by a gas, this type of reactor can be modified for use with a liquid coolant, as set forth in my copending application Serial No. 621,844, filed October 11, 1945.

While the theory of the nuclear chain fission mechanism in uranium set forth herein is based on the best presently known experimental evidence, it is not desired to be bound thereby, as additional experimental data later discovered may modify the theory disclosed.

What is claimed is:

1. In a neutronic reactor system, a core capable of sustaining a controlled chain reaction comprising a right cylindrical chamber at least 36 feet high and 36 feet in diameter, containing roughly spherical units of uranium carbide and of graphite, the diameter of said uranium carbide units and of said graphite units being between about one and three inches, said uranium carbide and said graphite units being randomly intermingled so that on the average at least every fifth unit in any direction is a fuel unit, the weight of the uranium component of the uranium carbide units being at least about 100 tons and the weight of the graphite being at least about 860 tons, a neutron reflector radially surrounding said core, a helium coolant, control means, means for passing helium through said core, and means for removing the heat imparted to the helium in the reactor core from the helium.

2. In a neutronic reactor system, a reactor core capable of sustaining a controlled chain reaction comprising a cylindrical chamber at least 36 feet high and 36 feet in diameter, containing roughly spherical units of uranium carbide and of graphite, the diameter of the uranium carbide units and of the graphite units being about two inches, said uranium units and graphite units being randomly intermingled so that on the average at least every fifth unit in any direction is a uranium unit, a void space between the units of approximately 50 percent of the total core volume, the weight of the uranium component of the uranium carbide units being approximately 100 tons and the weight of the graphite being at least about 860 tons, a neutron reflector radially surrounding said core, control means, a helium coolant, a water boiler, and means for passing helium in heat exchange relationship through said reactor core and thence through said boiler.

References Cited in the file of this patent

UNITED STATES PATENTS

| | | |
|---|---|---|
| 2,500,223 | Wellsetal | Mar. 14, 1950 |
| 2,708,656 | Fermi et al. | May 17, 1955 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |
| 648,293 | Great Britian | Jan. 3, 1951 |

OTHER REFERENCES

Goodman: "The Science and Eng. of Nuclear Power," vol. 1, page 275, Addison-Wesley (1947).

Kelly et al.: Phy. Rev. 73, 1135–9 (1948).

Nucleonics, June 1953, pp. 23, 50, 51, 52, 53.